United States Patent
Wallskog

[15] 3,691,847
[45] Sept. 19, 1972

[54] HYDROMETER
[72] Inventor: Alan G. Wallskog, Prospect Heights, Ill.
[73] Assignee: E. Edelmann & Co., Chicago, Ill.
[22] Filed: May 8, 1970
[21] Appl. No.: 35,856

[52] U.S. Cl. ................................. 73/441, 73/454
[51] Int. Cl. ........................................... G01n 9/14
[58] Field of Search ............... 73/441–443, 451–454; 220/97 C; 229/1.5 B; 116/114; 33/215 A; D52/1, 2

[56] References Cited

UNITED STATES PATENTS

| | | | |
|---|---|---|---|
| 2,312,307 | 3/1943 | Blanchard | 73/454 |
| 3,194,468 | 7/1965 | Barron | 229/1.5 B |
| 3,161,966 | 12/1964 | Gilliland | 33/215 A |
| 2,168,353 | 8/1939 | Linebarger | 73/450 X |
| 2,674,119 | 4/1954 | Trainor | 73/454 |
| 2,674,120 | 4/1954 | Trainor | 73/454 |

Primary Examiner—Richard C. Queisser
Assistant Examiner—C. E. Snee, III
Attorney—Lettvin and Gerstman

[57] ABSTRACT

A device for testing the specific gravity of a sample of liquid. The device has body means which define a float chamber having a pivotally mounted specific gravity float therein. Laterally enlarge flange means are provided along the upright edges of the body means to insulate the operator's hand from the heat of the liquid sample within the float chamber. The force of the liquid entering the chamber is directed against an internal baffle to still the liquid in the chamber.

5 Claims, 6 Drawing Figures

PATENTED SEP 19 1972

INVENTOR.
ALAN G. WALLSKOG
BY
Lettvin & Gerstman
ATTORNEYS

PATENTED SEP 19 1972

INVENTOR.
ALAN G. WALLSKOG
BY Lettvin & Gerstman
ATTORNEYS

HYDROMETER

FIELD OF THE INVENTION

This invention relates to an improved manually operable hydrometer for testing the specific gravity of fluids such as an antifreeze solution used in the radiator of an automotive-type vehicle.

BACKGROUND OF THE INVENTION

In testing the specific gravity of fluids, such as an antifreeze solution, the use of a pivotally mounted specific gravity float within a hydrometer float chamber is well known. Examples of such hydrometers are found in U.S. Pat. Nos. 2,674,119 and 2,674,120 issued Apr. 6, 1954.

Such prior art hydrometers have the problem of being difficult to grasp and hold when hot antifreeze solution is ingested into the hydrometer. The force of movement of liquid into the float chamber may also provide a problem in effecting an accurate hydrometer measurement and reading. Further, some prior art hydrometers of the pivotally mounted float type are frequency used improperly because of the difficulty in determining how to position the hydrometer substantially precisely relative to a vertical attitude, so that the float will give a correct reading.

It is an object of the present invention to provide a manually operable hydrometer of the pivotally mounted specific gravity float type which is characterized by being simple in construction and easy to handle, and by being effective as a measuring instrument without error caused by movement of liquid into the test chamber thereof.

It is a further object of the present invention to provide a hydrometer that has means for insulating the user's hand from the heat of the liquid sample.

It is another object of the present invention to provide a hydrometer of the pivotally mounted specific gravity float type having readily observable means for aiding the user in holding the hydrometer at a desired attitude to make the attitude of the float meaningful.

SUMMARY OF THE INVENTION

In accordance with the present invention, there is provided a hydrometer of the type that includes a pivotally mounted specific gravity float in an upright float chamber with an inlet thereto through which liquid is selectively ingested through an intake tube. The improvement comprises body means which define a float chamber that is elongated in the upright dimension. The body means provides generally parallel, spaced sides which bound the chamber in which a hot sample of liquid is ingested. Laterally enlarged flange means are provided along the upright edges of the body means for ease in grasping the body means and insulating the user's hand from the heat of the liquid sample within the float chamber.

In the illustrative embodiment, the flange means along an upright edge of the body means includes two spaced flanges which provide a groove therebetween. The spacing of the flanges is less than the diameter of the intake tube so that a portion of the intake tube can be retained by a press fit into the groove between the spaced flanges.

In the illustrative embodiment, the inlet to the chamber includes a tubular nipple which is integral with the body means and is inclined away from the vertical. The nipple serves as a mounting stud for one end of the intake tube. The body means are shaped to provide a stream-breaking wall spaced from the downstream end of the tubular nipple and positioned transversely of the longitudinal axis of the nipple.

DETAILED DESCRIPTION OF THE ILLUSTRATIVE EMBODIMENT

Figure 1:
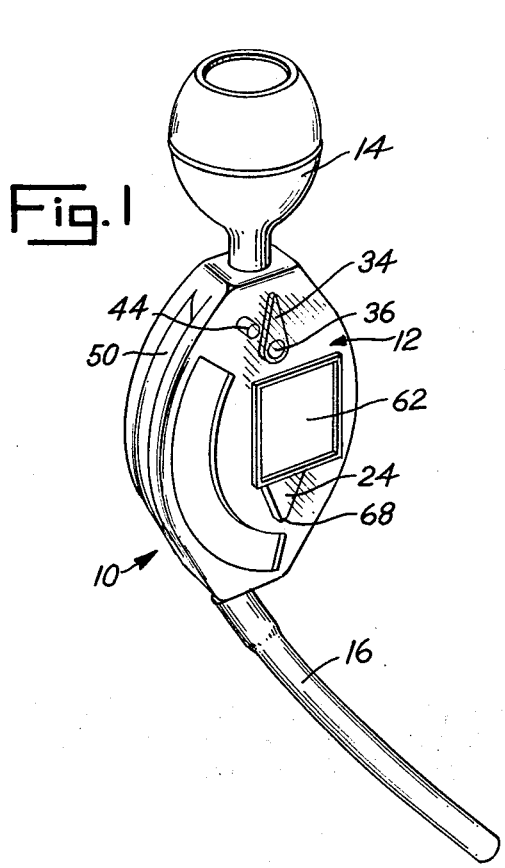
FIG. 1 is a perspective view of a hydrometer constructed in accordance with the present invention.

Referring to the figures, hydrometer 10 comprises a generally flat body portion 12, a flexible manually operated air bulb 14 connected to a nipple on the body portion at the top thereof, and a flexible intake tube 16 connected to an intake nipple at the bottom of the body portion. As seen most clearly in FIG. 6, upright nonlinear walls 18 and 20 of body portion 12 together with the spaced flat sides of the body 12 define a float chamber 22 that is elongated in the upright dimension. Within float chamber 22 there is positioned a specific gravity float 24 formed of a plastic material and carrying a weight 26 which is strategically positioned to calibrate float 24 for proper buoyancy with respect to antifreeze solution when the hydrometer 10 is in its proper upright position. Float 24 is pivotally connected to parallel spaced sides 28 and 30 of body 12 by a shouldered pin 32 which is integral with float 24 and whose reduced ends are journalled in pivot recesses in sides 28 and 30.

Also positioned within float chamber 22, adjacent the upper end thereof, is a pivoted pointer 34 formed of plastic material and carrying a weight 36 diametrically of the pointer's tip. Pointer 34 is pivoted between sides 28 and 30 by a shouldered pin 38 integral with the pointer and with reduced ends journalled in pivot recesses in the said sides. Both sides 28 and 30 carry indicia means 40 with which pointer 34 should be aligned by the user during testing. Weight 36 is positioned so that the pointer will be aligned with vertical lines 42 and 43 when the hydrometer is at desired attitude for a correct reading.

Figure 5:
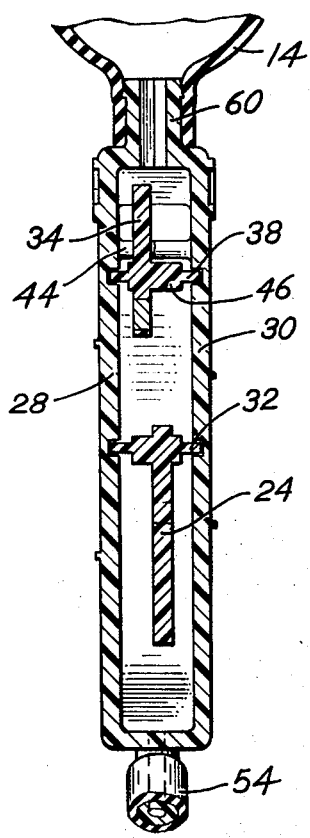
FIG. 5 is a fragmentary sectional view thereof, taken along the line 5—5 of FIG. 2.

A stop member 44 is connected across sides 28 and 30 to limit the rotation of pointer 34. By reason of the length and shouldering of pivot pins 32 and 38, the pointer 34 and float 24 are located in spaced parallel planes, as seen most clearly in FIG. 5, so as not to interfere with each other. The rotation of pointer 24 is limited in one direction by contact with wall 20 (as shown in FIG. 6) and by enlarged hub 46 (FIG. 5) on pin 38 attached to pointer 34.

Figure 6:
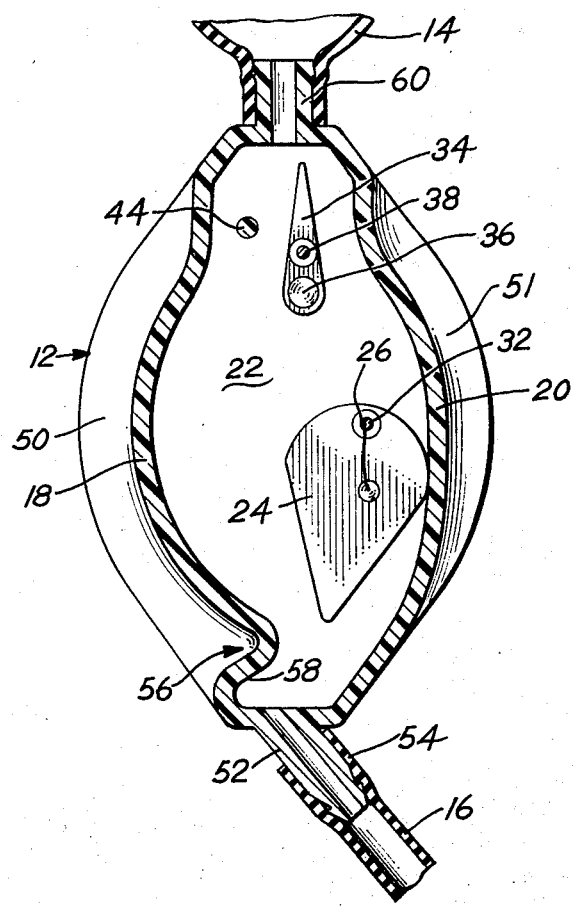
FIG. 6 is a fragmentary sectional view thereof, taken along the line 6—6 of FIG. 4.

Sides 28 and 30 are of a size to provide a periphery that extends outwardly of the walls 18 and 20 of the float chamber 22 as seen in FIG. 6. In this manner, the sides 28 and 30 cooperate with walls 18 and 20 to define indented grooves 50 and 51 between sides 28 and 30 and outwardly of respective sides 18 and 20. The arrangement effectively provides spaced flanges along each vertical edge of body 12 which are easy to grasp and which operate to insulate the user's hand from the heat of the liquid sample within the float chamber 22.

Figure 2:
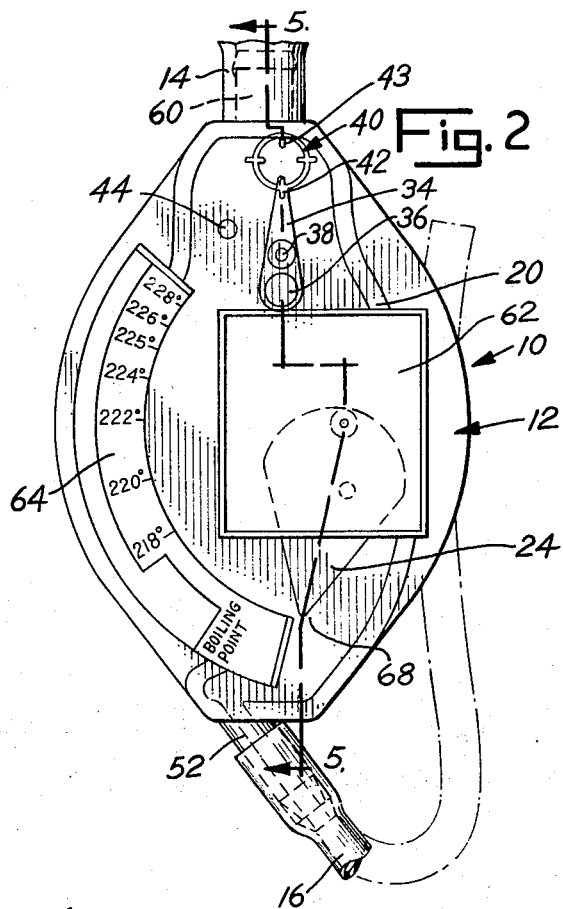
FIG. 2 is a fragmentary rear elevational view thereof, with a portion of the intake tube shown in its folded, closed position in dashed representation.
Figure 3:
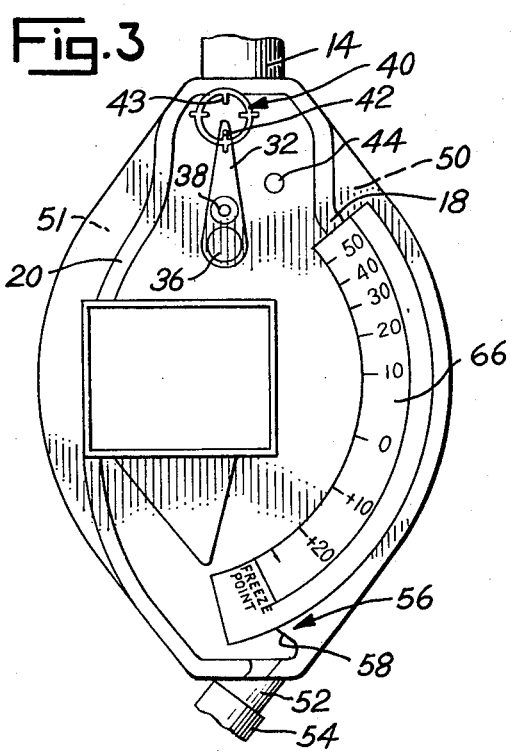
FIG. 3 is a fragmentary front elevational view thereof.
Figure 4:
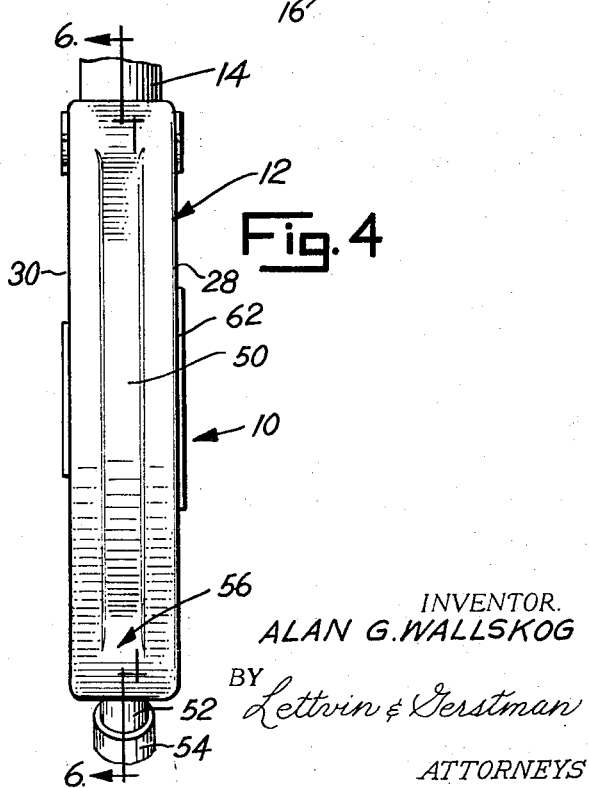
FIG. 4 is a fragmentary side elevational view thereof, taken from the right side of FIG. 3.

The body portion 12 also comprises a lower tubular nipple 52 which is formed integral therewith and inclined away from the vertical. The nipple 52 serves as a mounting stud for one end 54 of the flexible, resilient intake tube 16. As shown in broken line representation in FIG. 2, intake tube 16 may be bent and retained by a press fit within groove 52 during non-use of the hydrometer.

The bottom portion 56 of groove 50 and its adjacent wall 18 are shaped to define a stream-breaking wall 58 which is positioned adjacent and opposite the inlet opening of nipple 52 to the float chamber 22. In this manner, as a stream of liquid is ingested into the float chamber 22, its force will be broken and it enters quietly so that it does not foam or form air bubbles that would interfere with the operation of the float to yield a reliable reading. The suction bulb 14 is preferably formed of rubber or vinyl and is frictionally connected to an upper tubular nipple member 60 which is formed integrally at the top of the body 12.

Indicia may be provided on one or both sides of the hydrometer to instruct the user how to operate the device. To this end, an instruction label may be affixed to portion 62 of side 28 and a "Boiling Point" information label 64 may also be affixed to side 28 in calibration with pointer 24. A "Freeze Point" information label 66 may be affixed to side 30 in calibration with pointer 24.

In the operation of the hydrometer 10, intake tube 16 is placed into the automobile radiator and the radiator fluid is ingested into float chamber 22 by first squeezing and then releasing the bulb 14. Enough fluid should be ingested to totally immerse float 24, and the device is then removed from the radiator and pointer 34 is aligned with vertical lines 42, 43. The negative pressure created by flexing bulb 14 and atmospheric pressure operate to help keep the liquid sample in the chamber 22. When such alignment of pointer 34 occurs, point 68 of the float 24 will be pointing towards its "Boiling Point" numeral if side 28 is viewed and its "Freeze Point" numeral if side 30 is viewed. Although the antifreeze ingested into the float chamber may be very hot, the operator handling the hydrometer 10 will not feel the heat because of the insulating effect provided by the flanges formed at the edges of body 12 due to the greater width of sides 28 and 30 than the distance between the walls 18 and 20 defining the float chamber 22. While the use of the device has been discussed in connection with hot liquid, it will be understood that the tester also tests gravity of cold liquids.

Although an illustrative embodiment of the invention has been shown and described, it is to be understood that various modifications and substitutions may be made by those skilled in the art without departing from the spirit and scope of the present invention.

What is claimed is:

1. In a hydrometer that includes a pivotally mounted specific gravity float in an upright float chamber with an inlet thereto through which liquid is selectively ingested through an intake tube, the improvement, comprising, in combination: body means defining a float chamber that is elongated in the upright dimension, the body means providing generally parallel, spaced sides which bound the chamber in which a sample of liquid may be ingested, and laterally enlarged flange means along the upright edges of the body means providing for ease in grasping the body means and insulating the user's hand from the temperature of the liquid sample within the float chamber, the flange means along an upright edge of the body means including two spaced flanges providing a groove means therebetween, the spacing of the flanges being less than the diameter of the intake tube, whereby a portion of the intake tube may be retained by a press fit into the groove means between the spaced flanges.

2. A hydrometer as in claim 1, wherein the inlet to the chamber includes a tubular nipple integral with the body means and inclined away from the vertical, the nipple serving as a mounting stud for one end of the intake tube, and the body means being shaped to provide a stream-breaking wall spaced from the downstream end of the tubular nipple and positioned transversely of the longitudinal axis of said nipple.

3. A hydrometer as in claim 1, including a plumb means on the body means for aiding in holding the body means at a desired attitude to make the attitude of the float meaningful.

4. A hydrometer as in claim 3, wherein the plumb means includes a weighted pivot-pointer in the upper end of the float chamber and indicia means on the body means for alignment with the weighted pointer.

5. A hydrometer as in claim 3, wherein the plumb means includes a weighted pivot-pointer in the float chamber, and means mounting the pivot-pointer and specific gravity float for swinging in spaced parallel planes so as not to interfere with each other.

* * * * *